United States Patent

Nozoe et al.

[11] Patent Number: 5,939,630
[45] Date of Patent: Aug. 17, 1999

[54] ANGULAR VELOCITY SENSOR

[75] Inventors: Toshiyuki Nozoe, Koyoto; Takeshi Uemura, Hirakata; Masami Tamura, Uii, all of Japan

[73] Assignee: Matsushita Electric Industrial Co., Ltd., Osaka, Japan

[21] Appl. No.: 08/776,443

[22] PCT Filed: May 29, 1996

[86] PCT No.: PCT/JP96/01445

§ 371 Date: Apr. 17, 1997

§ 102(e) Date: Apr. 17, 1997

[87] PCT Pub. No.: WO96/38712

PCT Pub. Date: Dec. 15, 1996

[30] Foreign Application Priority Data

May 30, 1995 [JP] Japan ..................................... 7-131351
Apr. 9, 1996 [JP] Japan ..................................... 8-086189

[51] Int. Cl.$^6$ .............................. G01P 9/00; G12B 13/00
[52] U.S. Cl. .......................................... 73/504.16; 73/1.77
[58] Field of Search ........................... 73/504.16, 504.15, 73/504.12, 504.02, 1.77, 504.2, 504.03, 504.04, 1.37; 340/670, 671

[56] References Cited

U.S. PATENT DOCUMENTS

| | | | |
|---|---|---|---|
| 4,671,112 | 6/1987 | Kimura et al. | 73/504.16 |
| 5,131,273 | 7/1992 | Tabata et al. | 73/504.16 |
| 5,293,779 | 3/1994 | Nakamura et al. | 73/1.77 |
| 5,447,066 | 9/1995 | Terada et al. | 73/504.16 |

FOREIGN PATENT DOCUMENTS

| | | |
|---|---|---|
| 3-226620 | 10/1991 | Japan . |
| 4-215017 | 8/1992 | Japan . |
| 6-18267 | 1/1994 | Japan . |
| 7-181042 | 7/1995 | Japan . |

*Primary Examiner*—Hezron Williams
*Assistant Examiner*—Richard A. Moller
*Attorney, Agent, or Firm*—McDermott, Will & Emery

[57] ABSTRACT

The present invention aims to present an angular velocity sensor having a self diagnosis function.

An angular velocity sensor of the present invention includes a driving part for stably vibrating a driving part of a sensor element having a driver part and a detector part for detecting an angular velocity and detection means for detecting the angular velocity of the sensor element and obtains a self diagnosis signal for a malfunction by detecting a mechanical coupling signal obtained at the detection means.

4 Claims, 19 Drawing Sheets

ANGULAR VELOCITY SENSOR

FIELD OF THE INVENTION

The present invention relates to an angular velocity sensor having a self diagnosis function.

BACKGROUND OF THE INVENTION

A conventional tuning fork type, angular velocity sensor has detector plates at the top of two driver plates of the tuning fork type driving part facing in the orthogonal direction. When an angular velocity is applied at a continuous driving state of the driving part, the angular velocity is detected by the output of the detector plates vibrating in opposite direction to each other corresponding to the applied angular velocity.

In an angular velocity sensor in accordance with the prior art, a tightly sealed space is formed by a lid 2, which is made of resin. Lid 2 is attached at an aperture of a case 1, also made of resin, of which one end is open, as shown in FIG. 18.

Inside the tightly sealed space, a circuit board 3 and a metallic weight plate 4 are contained. Supporting pins 5 are attached at four corners inside the case 1 and weight plate 4 and circuit board 3 are elastically supported and fixed by the supporting pins 5. Dampers 6 made of rubber are attached at the four corners of weight plate 4 for the elastic support. Supporting legs 7 made of resin are put between damper 6 and circuit board 3. Supporting pins 5 are crashed at the tips toward the circuit board 3 side after penetrating dampers 6, supporting legs 7 and circuit board 3. Thus, circuit board 3 and weight plate 4 are elastically supported and fixed. A metallic supporting pin 8 is inserted and fixed vertically to weight plate 4, on the circuit board 3 side, as shown in FIG. 19. One end of a metallic, supporting pin 9, is inserted, is fixed to supporting pin 8, and is parallel to weight plate 4. The diameter of supporting pin 9 is about one fifth of the diameter of supporting pin 8. Furthermore supporting pin 9 is made of metallic material having elasticity such as a piano wire, wherein the other end of supporting pin 9 fixed by soldering to a metal plate 10.

One end of each metallic driver plates 11 and 12, facing other across supporting pins 8 and 9, is fixed to each side of metal plate 10. Plate-shaped piezoelectric elements 11a and 12a are fixed on the surfaces of metallic driver plates 11 and 12, respectively. In this way, the tuning fork type driving part is formed. The other ends of driver plates 11 and 12 are twisted orthogonally so that piezoelectric elements 11a and 12a and other plate-shaped piezoelectric elements 13a and 14a are fixed on detector plates 13 and 14, as shown in FIG. 19. In this way, the detector part is formed. A sensor element is composed of the driver part and the detector part.

There is a problem of a usual angular velocity sensor however. Namely, the usual sensor has no ability to judge detected information, drawn to a malfunction of the components, as such, nor the ability to send such information, judged to be a malfunction of the components, to the outside.

The present invention aims to be able to detect, from the outside, the state in which the sensor can not perform a correct detection resulting from partial damage, thereby providing a highly reliable angular velocity sensor.

SUMMARY OF THE INVENTION

To achieve the purpose, an angular velocity sensor of the present invention includes drive means including a sensor element having a driver part and a detector part for detecting an angular velocity, a driver circuit for supplying a driving signal to the driving part of the sensor element and a monitor circuit to which a monitor signal is supplied from the sensor element and stably driving and vibrating the driver part of the sensor element by applying the output of the monitor circuit to the driver circuit through an AGC (automatic gain control) circuit, detection means including a charging amplifier to which an output of the detector part of the sensor element is supplied and a synchronous detector to which an output of the charging amplifier is supplied through a band pass filter and detecting an output of the band pass filter synchronizing with a driving signal from the drive means and outputting an angular velocity signal, and self diagnosis means receiving a mechanical coupling signal obtained from the detection means other than an angular velocity signal detecting abnormality of the sensor element and outputting a self diagnosis signal.

According to the above composition, by making the mechanical coupling signal always obtained from the detection, means a signal for self diagnosis because of its composition, whether the angular velocity signal is in a state which can perform a normal detection can be detected or not and because the mechanical coupling signal surely generates, it is unnecessary to independently provide means for generating the mechanical coupling signal and not only the composition is very simple and can be highly reliable for self diagnosis but also it is possible to know the timing which the characteristic becomes stable after the sensor start to work and to utilize an sensor output more early.

DETAILED DESCRIPTION OF THE INVENTION

First Exemplary Embodiment

Figure 1:
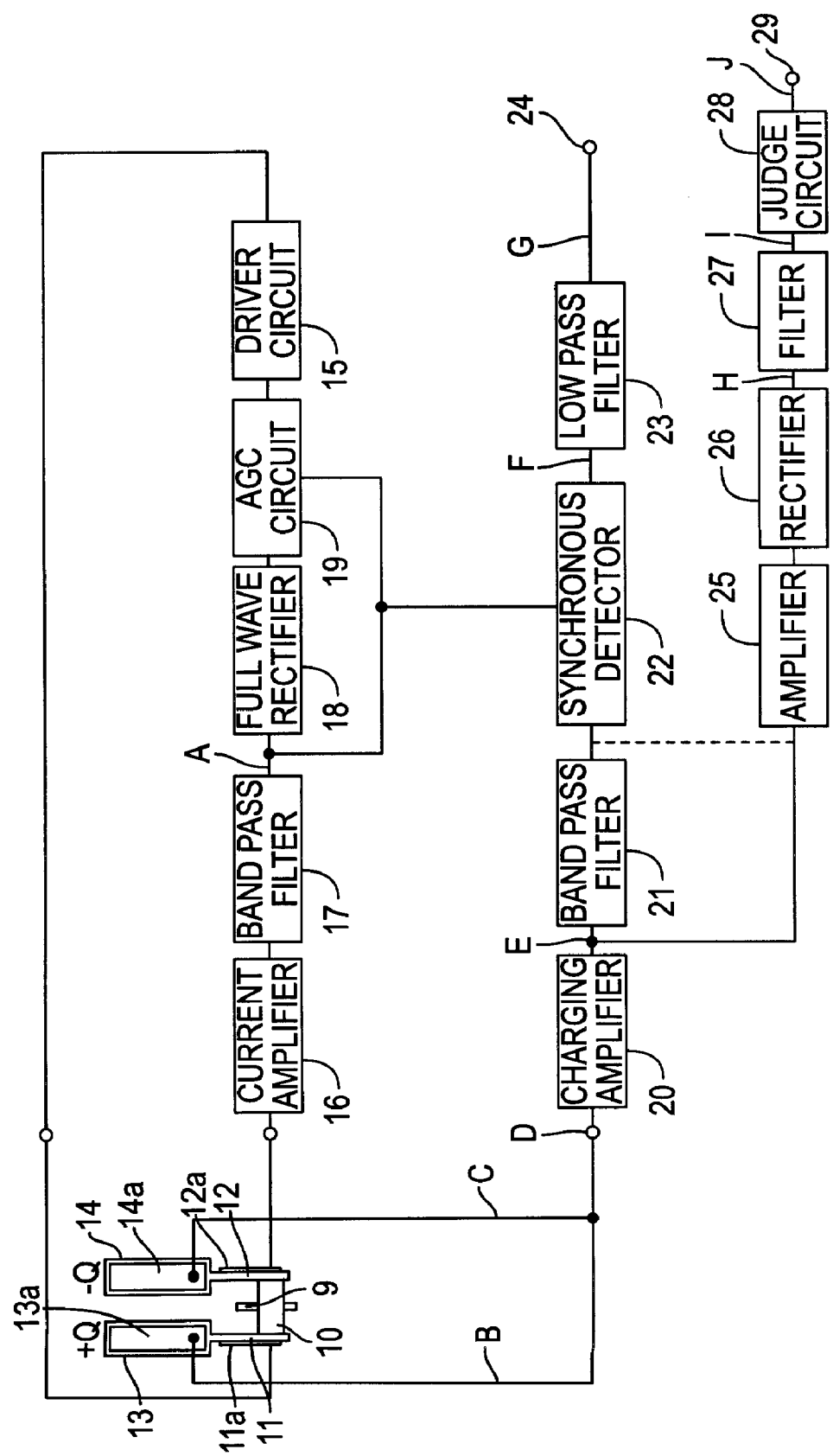
FIG. 1 is a block diagram of an angular velocity sensor in accordance with a first exemplary embodiment of the present invention.
Figure 12:
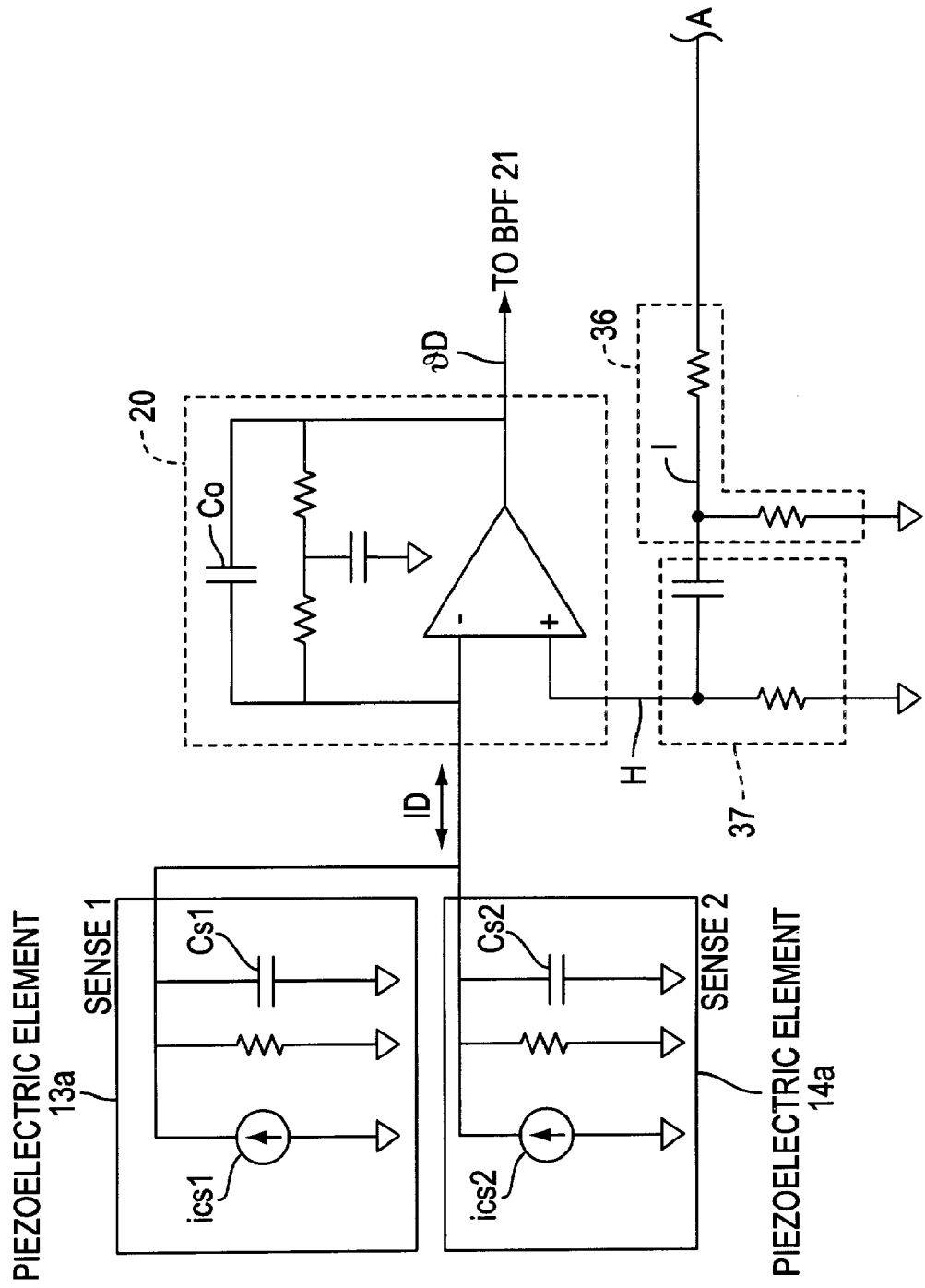
FIG. 12 is a circuit diagram showing a circuit configuration of the principal part of the angular velocity sensor.

FIG. 1 is a circuit diagram of an angular velocity sensor of an angular velocity sensor in accordance with a first exemplary embodiment of the present invention. An alternating signal of about 1 Vp-p and 1.5 kHz is applied to a piezoelectric element 11a of a driver plate 11 as a sensor element from a driver circuit. Accordingly, driver plates 11 and 12 start a tuning fork vibration inward and outward against a supporting pin 9 as a center. A voltage proportional to the applied signal is induced at a piezoelectric element 12a of a driver plate 12 by a tuning fork vibration and becomes a monitor signal A shown as waveform A in FIG. 12 at point A in FIG. 1, after passing a current amplifier 16 and a band pass filter 17. This signal is fed back to a driver circuit 15 through a full wave rectifier 18 and an AGC circuit 19 and thus a driving signal is automatically controlled in its amplitude.

Figure 2:
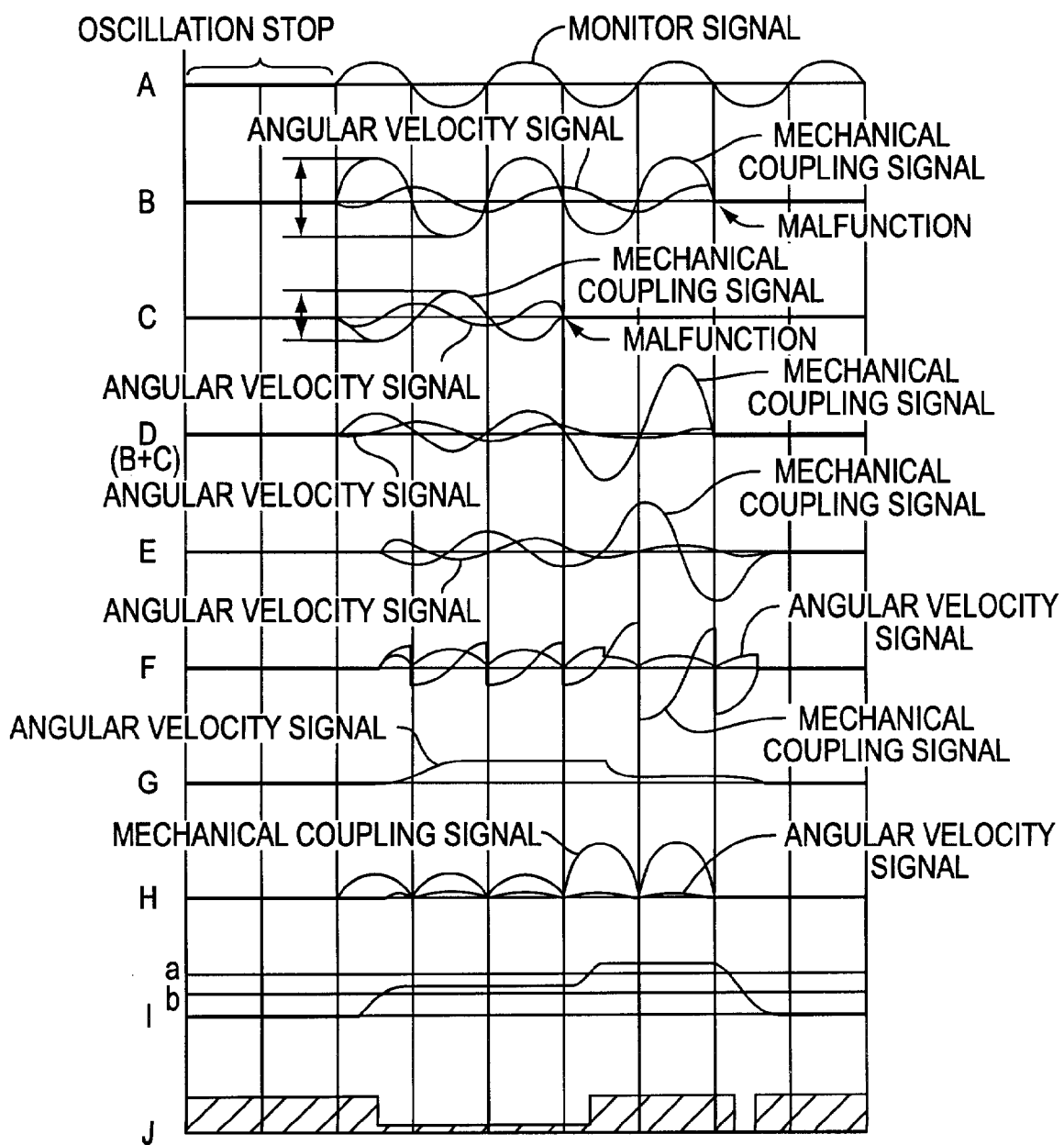
FIG. 2 shows waveforms at various points of the angular velocity sensor.

In the detector part, when piezoelectric elements 13a and 14a detect an angular velocity, both piezoelectric elements 13a and 14a output angular velocity signals of +Q. These angular velocity signals are shown in FIG. 2 as waveforms B and C. These angular velocity signals are then synthesized at point D, shown in FIG. 1, thus becoming an angular velocity signal shown in FIG. 2 as waveform D. Angular velocity signal D is outputted from an output terminal 24 passing through a charging amplifier 20, a band pass filter 21, a synchronous detector 22 and a low pass filter 23. The angular velocity signals at points E, F and G shown in FIG. 1 are shown in FIG. 2 as waveforms E, F and G, respectively.

In the exemplary embodiment, although detector plates 13 and 14 have to be set orthogonally against driver plates 11 and 12, it is essentially difficult to put them in true orthogonal directions and moreover it is impossible to make piezoelectric elements 13a and 14a quite the same in size and attaching method. As a result, piezoelectric elements 13a and 14a always generate mechanical coupling signals shown in FIG. 2 as waveform B and C other than the angular velocity signals described above. In this case, piezoelectric elements 13a and 14a are pasted on the same side surfaces of detector plates 13 and 14 and the centers of gravity of detector plates 13 and 14 deviate a little toward the pasted sides of piezoelectric elements 13a and 14a. Therefore, when driver plates 11 and 12 make a tuning fork vibration, for example when they open outward, they open leaning toward the sides of piezoelectric elements 13a and 14a. Accordingly, mechanical coupling signals generated at piezoelectric elements 13a and 14a are in a reciprocal phase as shown in FIG. 2 as waveforms B and C and when the mechanical coupling signals are synthesized at point D shown in FIG. 1, the synthesized mechanical coupling signal becomes small. The synthesized mechanical coupling signal is amplified at a charging amplifier 20 and at amplifier 25, rectified at a rectifier 27 and then the signal level is judged at a judge circuit 28 and the judged result is outputted from a signal output terminal 29. The signals at points H, I and J shown in FIG. 1 are shown in FIG. 2 as waveforms H, I and J, respectively. When signal I outputted from filter 27 is between level a and level b, the output of judge circuit 28 is in a low level as shown in FIG. 2 as waveform J and is outputted from terminal 29.

In the case in which, for example, detector plate 14 shown in FIG. 1 is damaged or its lead wire is broken, both the angular velocity signal and the mechanical coupling signal from piezoelectric element 14a become zero after malfunction, as shown in FIG. 2 as waveform C. As a result, only a mechanical coupling signal from piezoelectric element 13a appears at point D shown in FIG. 1 and it becomes a much larger mechanical coupling signal than before. Therefore, the output of filter 27 becomes larger than level a shown in waveform I of FIG. 2 and a high level signal is outputted from judge circuit 28 as shown in FIG. 2 as waveform J. When both detector plates 13 and 14 are damaged or both lead wires are broken, the output of filter 27 becomes smaller than level b shown in waveform I of FIG. 2 and a high level signal is also outputted from judge circuit 28 as shown in FIG. 2 as waveform J. When such a high level signal is outputted, information that the angular velocity sensor is malfunctioning is transmitted.

Second Exemplary Embodiment

Figure 3:
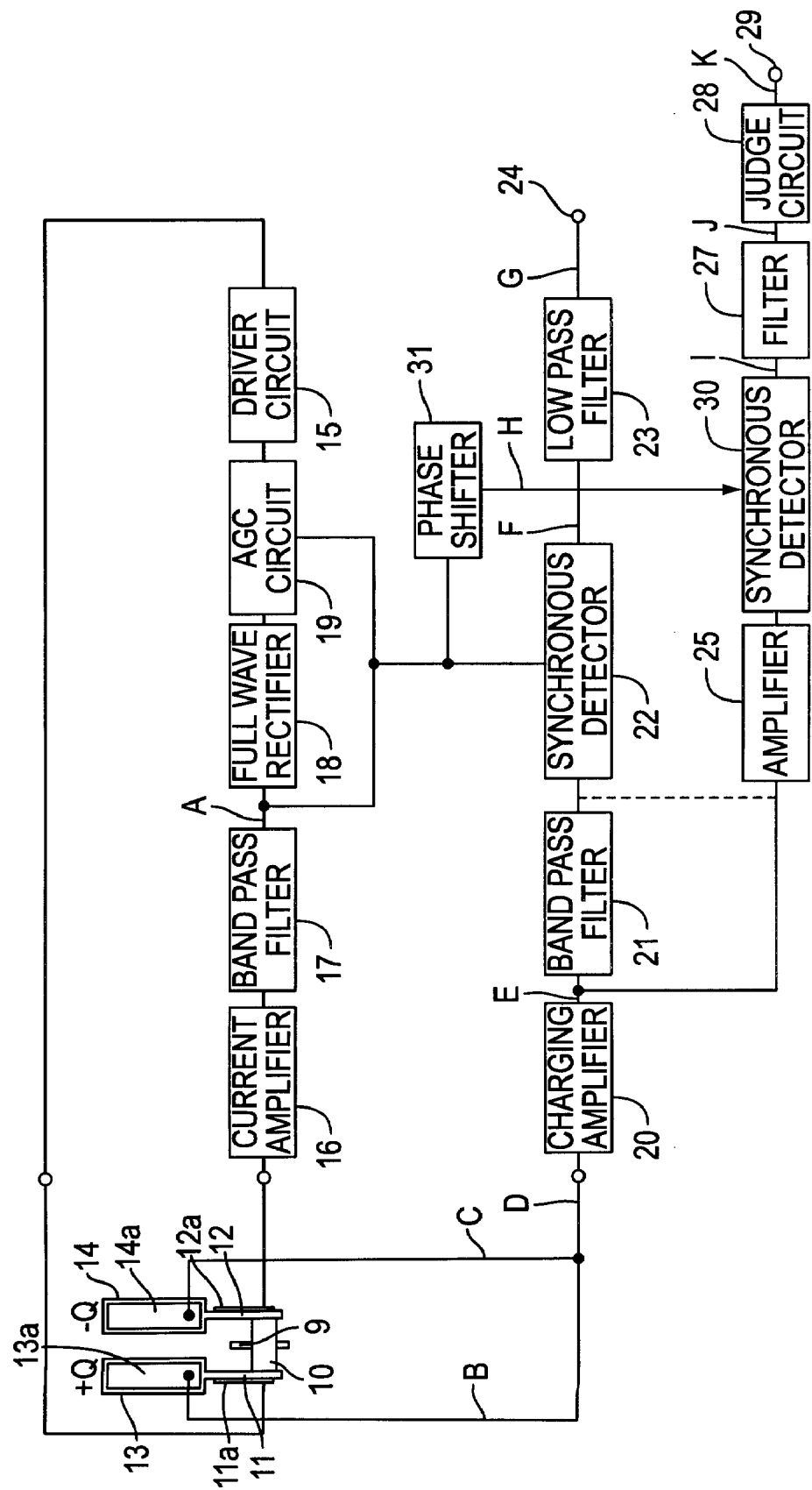
FIG. 3 is a block diagram of an angular velocity sensor in accordance with a second exemplary embodiment of the present invention.
Figure 4:
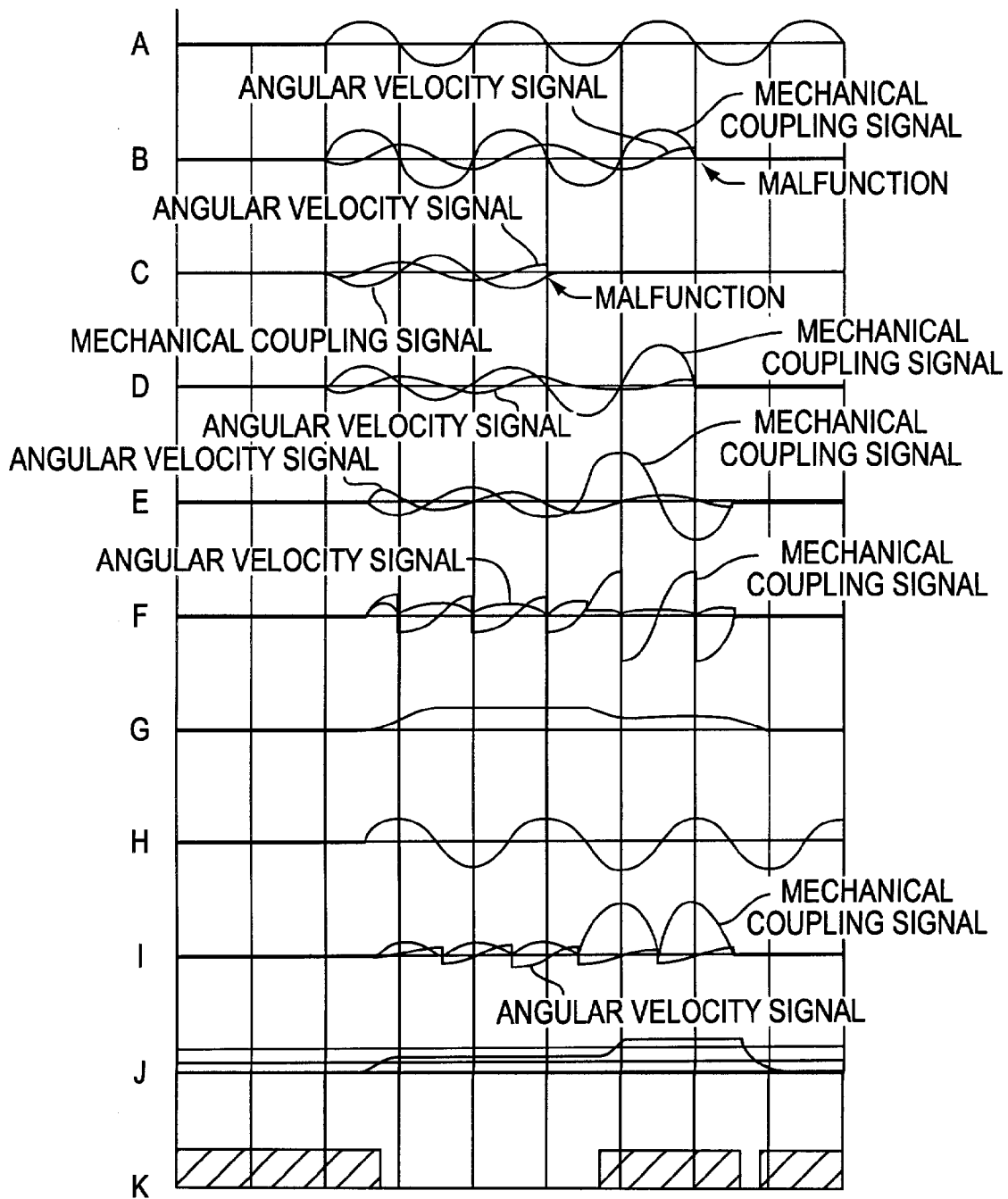
FIG. 4 shows waveforms at various points of the angular velocity sensor.

FIG. 3 is a circuit diagram of an angular velocity sensor in accordance with a second exemplary embodiment of the present invention. In this exemplary embodiment, a synchronous detector 30 is inserted between amplifier 25 and filter 27. A synchronous detection is executed, by using a feedback signal from the feedback circuit, for a driving signal. Such a driving signal is a phase shifted signal from the signal of point A at phase shifter 31 shown in FIG. 3. In other words, because the mechanical coupling signal flowing in amplifier 25 contains an angular velocity signal, the level of the mechanical coupling signal is brought close to a correct value by canceling the angular velocity signal. The signal shown in FIG. 4 as waveform A flowing at point A shown in FIG. 3 is delayed by 90 degrees at phase shifter 31. If the output from amplifier 25 is detected synchronized with a signal H delayed by 90 degrees (shown in FIG. 4 as waveform H), the angular velocity signal is canceled as shown in FIG. 4 as waveform H and it is possible to bring the mechanical coupling signal level inputted to filter 27 close to a correct value.

Third Exemplary Embodiment

Figure 5:
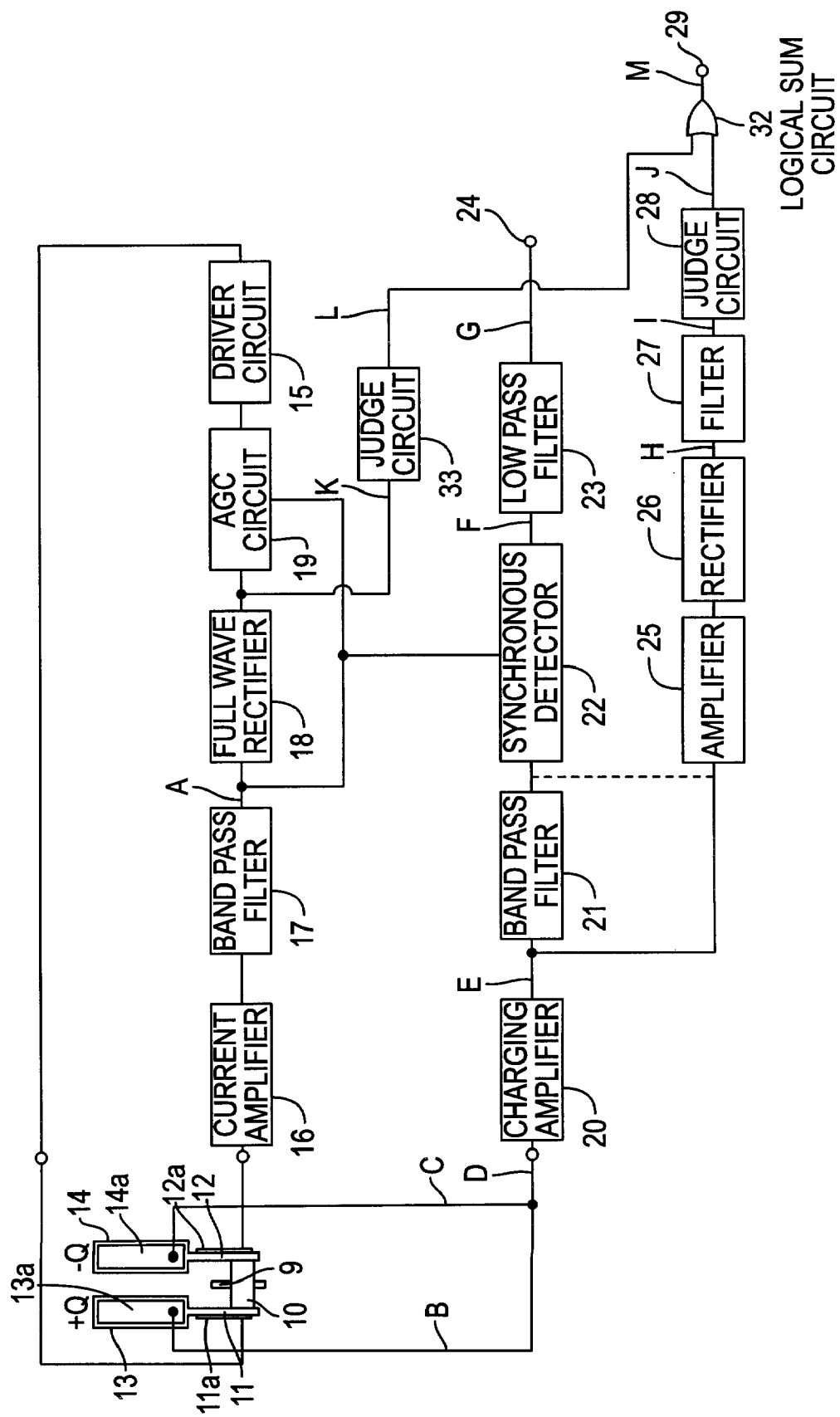
FIG. 5 is a block diagram of an angular velocity sensor in accordance with a third exemplary embodiment of the present invention.
Figure 6:
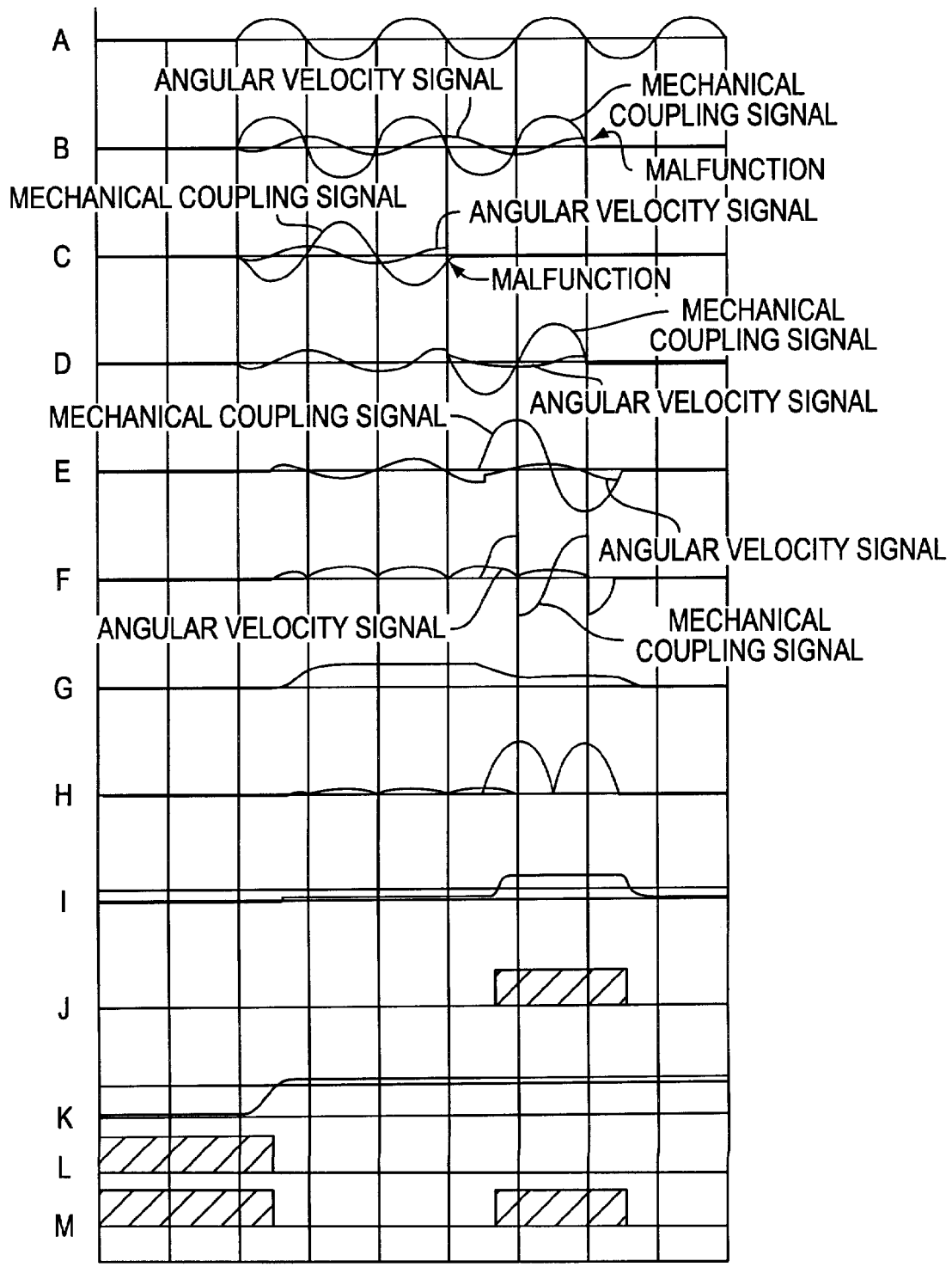
FIG. 6 shows waveforms at various points of the angular velocity sensor.

FIG. 5 is a circuit diagram of an angular velocity sensor in accordance with a third exemplary embodiment of the present invention. In this exemplary embodiment, when the mechanical coupling signals outputted from piezoelectric elements 13a and 14a are added at point D, shown in FIG. 5, the sum is made zero as an initial setting. While the sums are not zero in the first and second exemplary embodiments, in the third exemplary embodiment, the sum of the mechanical coupling signals outputted from piezoelectric elements 13a and 14a is made zero by trimming either detector plate 13 or 14 at the initial setting. It is shown in FIG. 6 as waveform D. For example, at a normal state before a malfunction such as a damage of detector 14 or a break of lead wire, no mechanical coupling signal generates at point D shown in FIG. 5. However, after malfunction, the mechanical coupling signal from piezoelectric element 14a is hard to generate and the mechanical coupling signal appears at point D, as shown in FIG. 6 as waveform D. As a result, the output of judge circuit 28 is a high level at the malfunction as shown in FIG. 6 as waveform J. A signal informing the angular velocity sensor's malfunction is then outputted from signal output terminal 29 through a logical sum circuit 32, as shown in FIG. 6 as waveform L. In this exemplary embodiment, A driving signal for feedback, that is an output of full wave rectifier 18, is supplied to logic sum circuit 32 through judge circuit 33. It aims to be able to inform the malfunction from signal output terminal 29, even when driver plates 11 and 12 are not driven. Therefore, the driving signal is made to be supplied to logical sum circuit 32 through judge circuit 33. Judge circuit 33 outputs a high level when the feedback signal is zero because driver plates 11 and 12 are not driven and outputs a signal informing the malfunction from signal output terminal 29 through logical sum circuit 32.

In the case of a composition to input the output of charging amplifier 20 to amplifier 25 as a self diagnosis means as shown in the first exemplary embodiment, in the second and the third exemplary embodiments, when a signal exceeding an input range of synchronous detector 22 is inputted from band pass filter 21, the output signal at output terminal 24 sometimes varies although no angular velocity signal is added. In this case, it is desirable to change to input the output signal of band pass filter 21 to amplifier 25, to set to detect saturation of synchronous detector 22 as a criterion for judging and to match a time constant of filter 27 with a time constant of low pass filter 23.

Fourth Exemplary Embodiment

Figure 7:
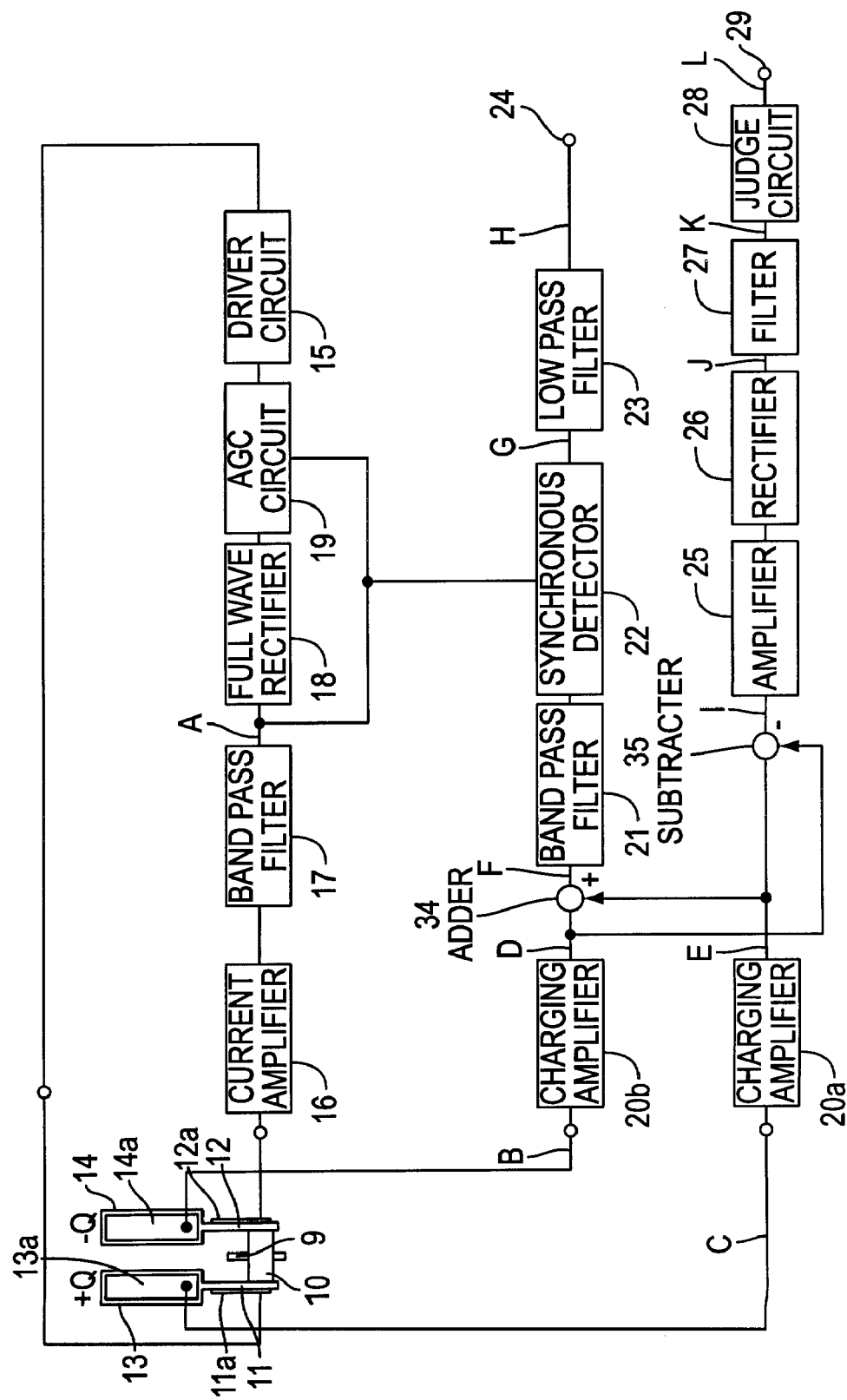
FIG. 7 is a block diagram of an angular velocity sensor in accordance with a fourth exemplary embodiment of the present invention.
Figure 8:
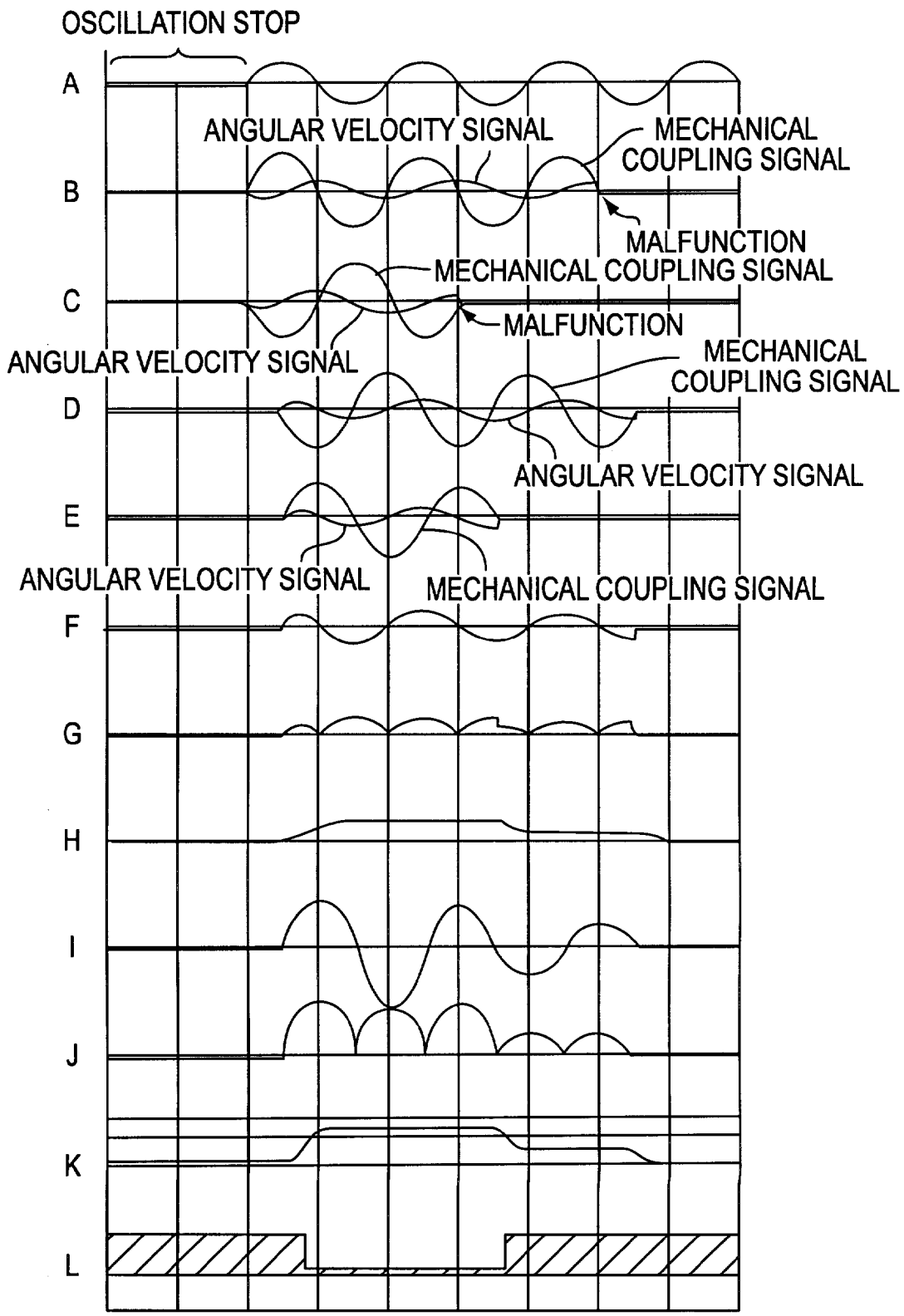
FIG. 8 shows waveforms at various points of the angular velocity sensor.

FIG. 7 is a circuit diagram of an angular velocity sensor in accordance with a fourth exemplary embodiment of the present invention. Also in this exemplary embodiment, an initial setting is made so that when the mechanical coupling signals from piezoelectric elements 13a and are added, their sum becomes zero by trimming either detector plate 13 or 14, like in the third exemplary embodiment. The signal from piezoelectric element 13a is amplified at a charging amplifier 20a, the signal from piezoelectric element 14a is amplified at a charging amplifier 20b, they are added at adder 34 and the sum signal is outputted from output terminal 24 as an angular velocity signal after being processed. A signal subtracted the output of charging amplifier 20b from the output of charging amplifier 20a at subtracter 35 is outputted from signal output terminal 29 as a self diagnosis signal after being processed. Waveforms at the points in FIG. 7 are shown in FIG. 8. Amplifier 25, rectifier 26 and filter 27 can be omitted. Although the explanation was made using a tuning fork type angular velocity sensor, it is possible to detect a malfunction using the mechanical coupling signal in an angular velocity sensor of triangular prism type, solid cylinder type, tuning fork type or tubular type because such additional types of angular velocity sensors also generate a mechanical coupling signal.

Fifth Exemplary Embodiment

Figure 9:
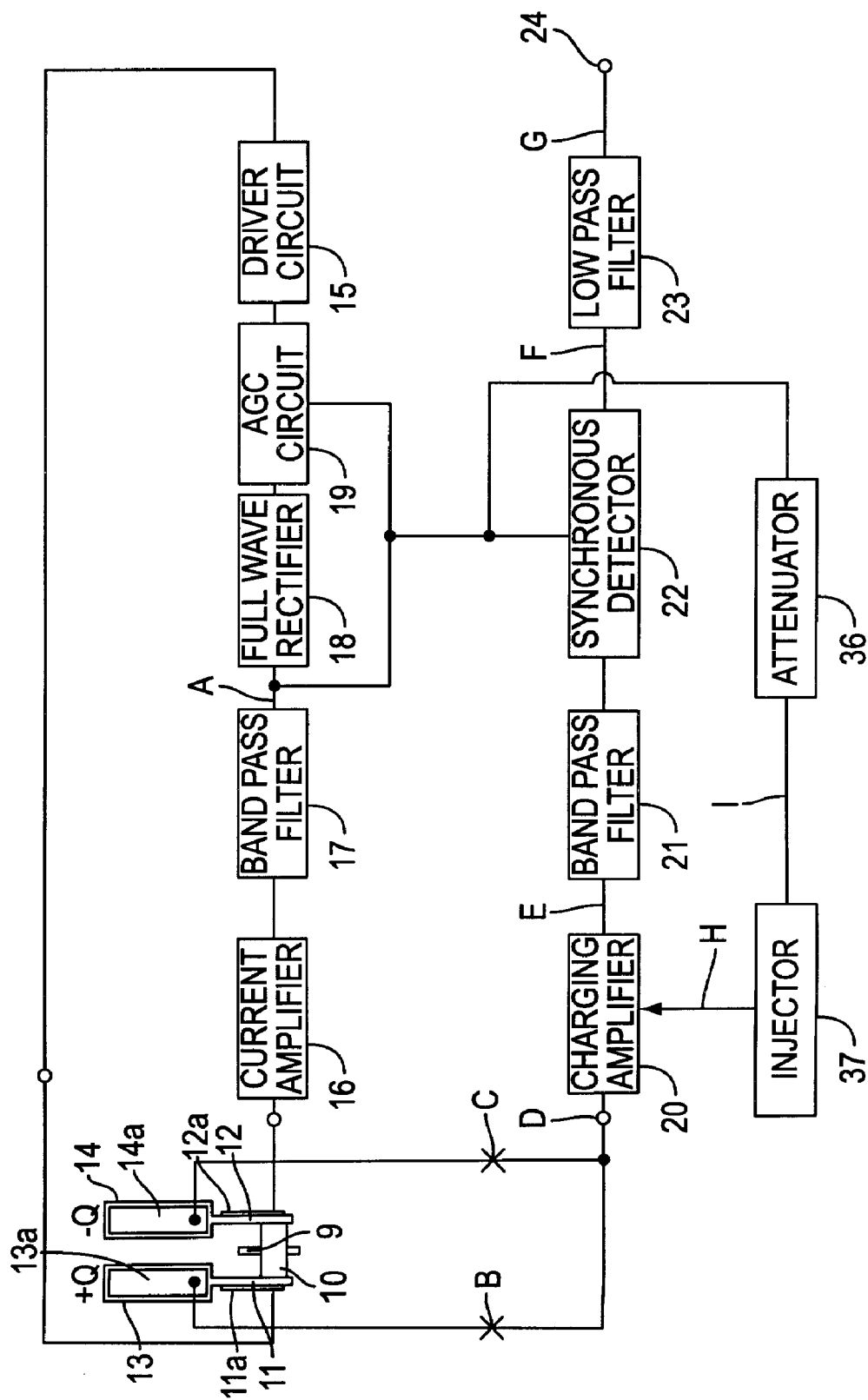
FIG. 9 is a block diagram of an angular velocity sensor in accordance with a fifth exemplary embodiment of the present invention.

FIG. 9 is a circuit diagram of an angular velocity sensor in accordance with a fifth exemplary embodiment of the present invention.

Figure 10:
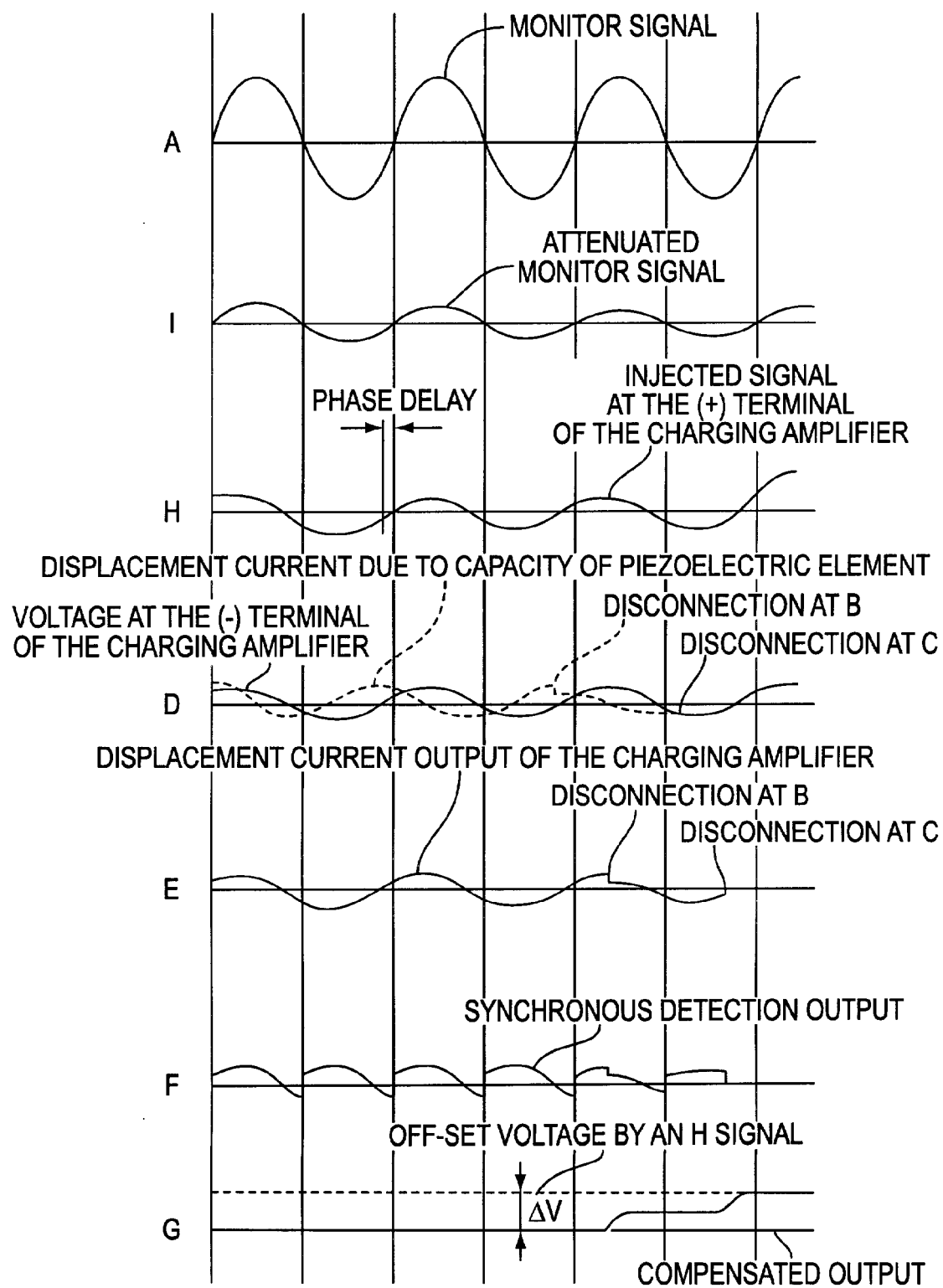
FIG. 10 shows waveforms at various points of the angular velocity sensor.

An alternating signal of about 1 Vp-p and 1.5 kHz is applied from a driver circuit 15 to a piezoelectric element 11a of a driver plate 11. Driver plates 11 and 12 start tuning fork vibration inward and outward against a supporting pin 9 as a center. A voltage proportional to an applied signal is induced at a piezoelectric element 12a of driver plate 12 by tuning fork vibration and is outputted from point A as a monitor signal after passing through a current amplifier 16 and a band pass amplifier 17. The output signal is shown in FIG. 10 as waveform A. This signal fed back to a driver circuit 15 through an AGC (Automatic Grain Control) circuit 19 and the level of the driving signal is controlled to be always constant at point A. In the detector part, the signals from piezoelectric elements 13a and 14a are synthesized at point D and the synthesized signal is supplied to a charging amplifier 20. The monitor signal from point A synchronized with a tuning fork vibration is attenuated by an attenuator 36 and is supplied to a non-inverted input terminal of a charging amplifier 20 after passing through a injector 37. The output of charging amplifier 20 is outputted from an output terminal 24 through a band pass filter 21, a synchronous detector 22 and a low pass filter 23. Signal waveforms at point I (the output of attenuator 36), H (the output of injector 37), E (the output of charging amplifier 20), F (the output of synchronous detector 22) and G (the output of low pass filter 23) are shown in FIG. 10 as waveforms I, H, E, F and G, respectively.

Figure 11A:
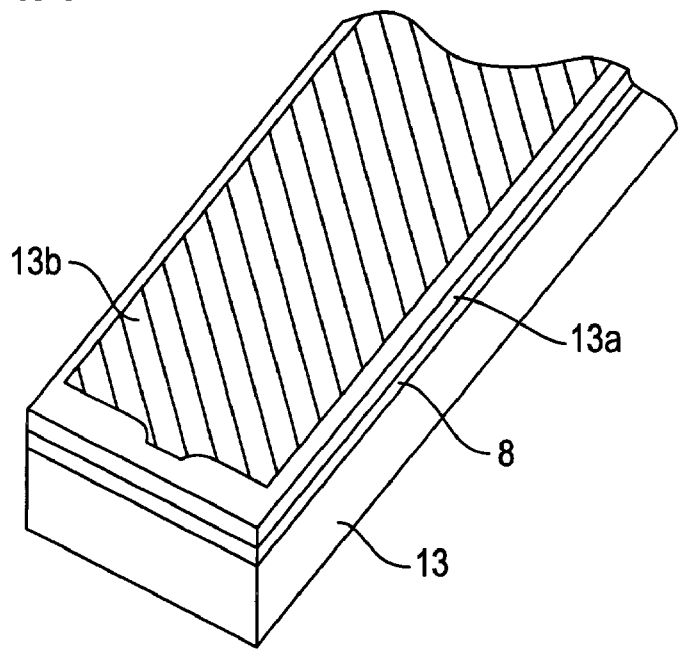
FIG. 11(a) is an expanded squint view of an essential part of the angular velocity sensor.

In this exemplary embodiment, piezoelectric element 13a detecting an angular velocity is glued an detector plate 13 through adhesive 8 and a silver electrode 13b is formed on piezoelectric elements 13a as shown in FIG. 11(a).

Figure 11B:
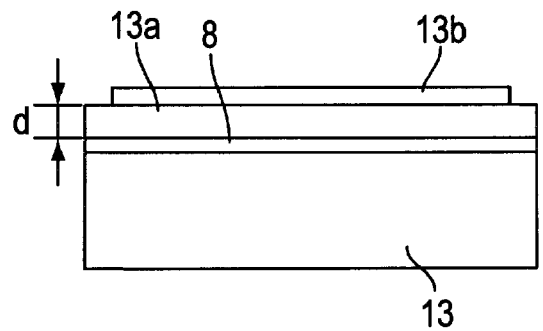
FIG. 11(b) is a cross sectional view of the essential part of the angular velocity sensor.
Figure 11C:
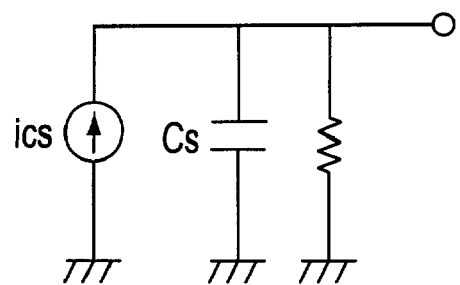
FIG. 11(c) is an equivalent circuit diagram of the angular velocity sensor.

Detector plate 13, piezoelectric elements 13a and silver electrode 13b form a parallel plate capacitor as shown in FIG. 11(b) and its equivalent circuit is shown in FIG. 11(c). The capacity of a capacitor formed by piezoelectric element 13a is expressed by equation (1).

$$Cs1 = \epsilon * S/d \tag{1}$$

$\epsilon$: permitivity of piezoelectric element,

S: area of the electrode and d: thickness of piezoelectric element.

Similarly, the capacity of a capacitor formed by, piezoelectric element 14a is expressed by equation (2).

$$Cs2 = \epsilon * S/d \tag{2}$$

$\epsilon$: permitivity of piezoelectric element,

S: area of the electrode and d: thickness of piezoelectric element.

There are following relations between the sensitivities of piezoelectric elements detecting an angular velocity and capacities Cs1 and Cs2 expressed by equations (1) and (2).

The sensitivity is proportional to area S and capacity C is proportional to area S, therefore the sensitivity is proportional to capacity C. Therefore, if a capacity variation can be detected, a sensitivity variation can be conjectured and it is possible to detect a sensitivity abnormality.

Now, monitor signal A at point A is attenuated at attenuator 36 as shown in waveform I of FIG. 10 and supplied to injector 37. Injector 37 is composed of, for example, a capacitor and a resistor shown in FIG. 12 and a signal phase shifted against monitor signal A as shown in waveform H of FIG. 10 is supplied to non-inverted input terminal of charging amplifier 20. However, because the inverted input and the non-inverted input of charging amplifier 20 have virtually the same potential, the signal from injector 37 supplied to the non-inverted input terminal appears also at the inverted input terminal of charging amplifier 20 as shown by waveform D in FIG. 10.

As a result, a displacement current ID shown by waveform D (broken line) of FIG. 10 generates at capacity components Cs1 and Cs2 of piezoelectric elements 13a and 14a connected to the inverted input terminal and a voltage shown by waveform E of FIG. 10 is outputted from charging amplifier 20. The output voltage ve at point E is expressed by equation (3).

$$ve = Vm^* \alpha^* (1/C0)^* (Cs1+Cs2)^* ID \angle \phi \qquad (3)$$

ve: output voltage E (Vp-p) of charging amplifier,
Vm: monitor voltage (Vp-p),
α: attenuation factor (0<α<1) of attenuator 36,
∠φ: phase shift (0°<φ<90°) by injector 37,
C0: feedback capacity (pF) of charging amplifier 20, and
ID: displacement current (pA).

Signal Vout obtained from output terminal 24 is expressed by equation (4).

$$Vout = A^* D^* Vm^* \alpha^* (1/CO)^* (Cs1+Cs2)^* ID^* \sin \phi \qquad (4)$$

D: detection constant of synchronous detector 22 and
A: dc gain of low pass filter 23.

Because signal E shown in FIG. 10 is phase shifted by ∠φ against monitor signal A, signal E is detected at synchronous detector 22 after being amplified at band pass filter 21. Only a signal component corresponding to the phase shift is extracted, amplified at low pass filter 23 and outputted from terminal 24 as a dc off-set component. Usually, it is good to adjust the off-set voltage of the output, for example 2.5 V, considering this dc off-set component.

From equation (3), because signal E shown in FIG. 10 is proportional to capacity Cs1 or Cs2 of piezoelectric element 13a or 14a for angular velocity detection, respectively, for example, when a disconnection occurs at point B or C shown in FIG. 9, there is a signal level variation as shown by waveforms E and F of FIG. 10 and as a result, the voltage level at output terminal 24 varies. The abnormality is judged as a sensor malfunction by, for example, threshold judgment of this level variation.

Because the input signal of injector 37 is obtained from a monitor signal of the drive circuit and the output signal is applied to the input terminal of charging amplifier 20, whenever any component or any part of the tuning fork, the drive circuit or the-detection circuit malfunction, a signal appears at output terminal 24 as a variation of the dc off-set component and it is always possible to detect a sensor malfunction.

Sixth Exemplary Embodiment

Figure 13:
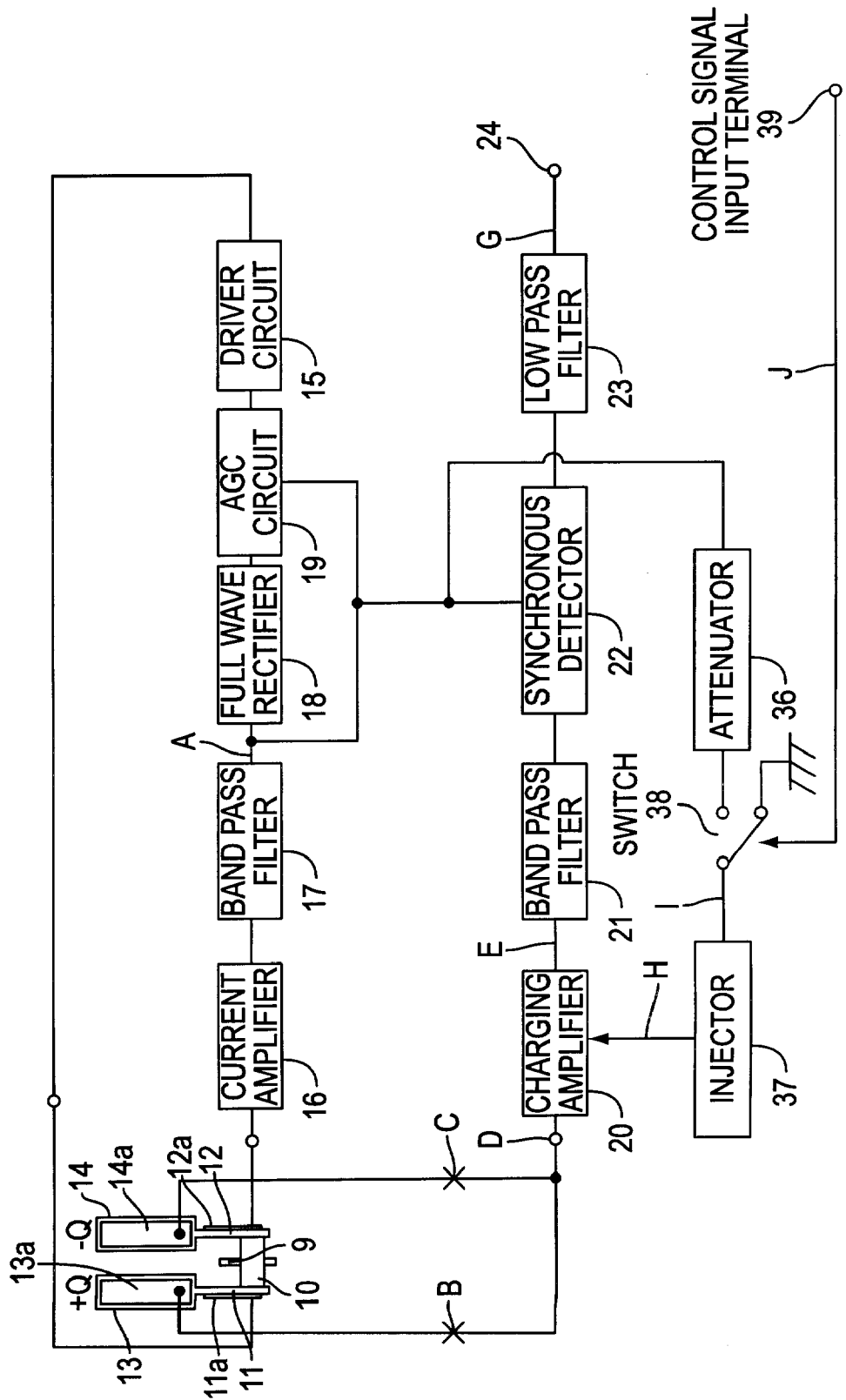
FIG. 13 is a block diagram of an angular velocity sensor in accordance with a sixth exemplary embodiment of the present invention.
Figure 14:
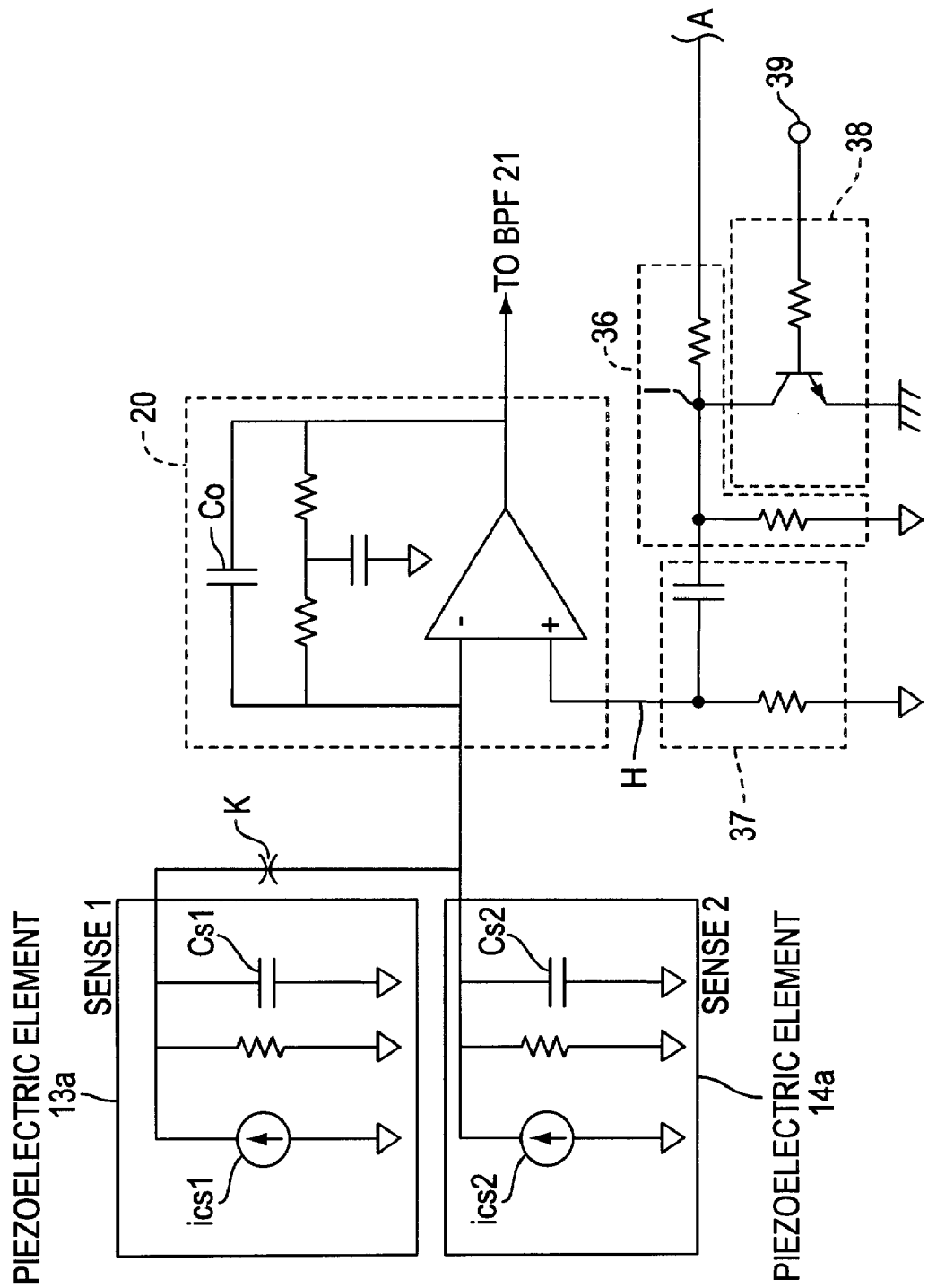
FIG. 14 is a circuit diagram of the essential part of the angular velocity sensor.
Figure 15:
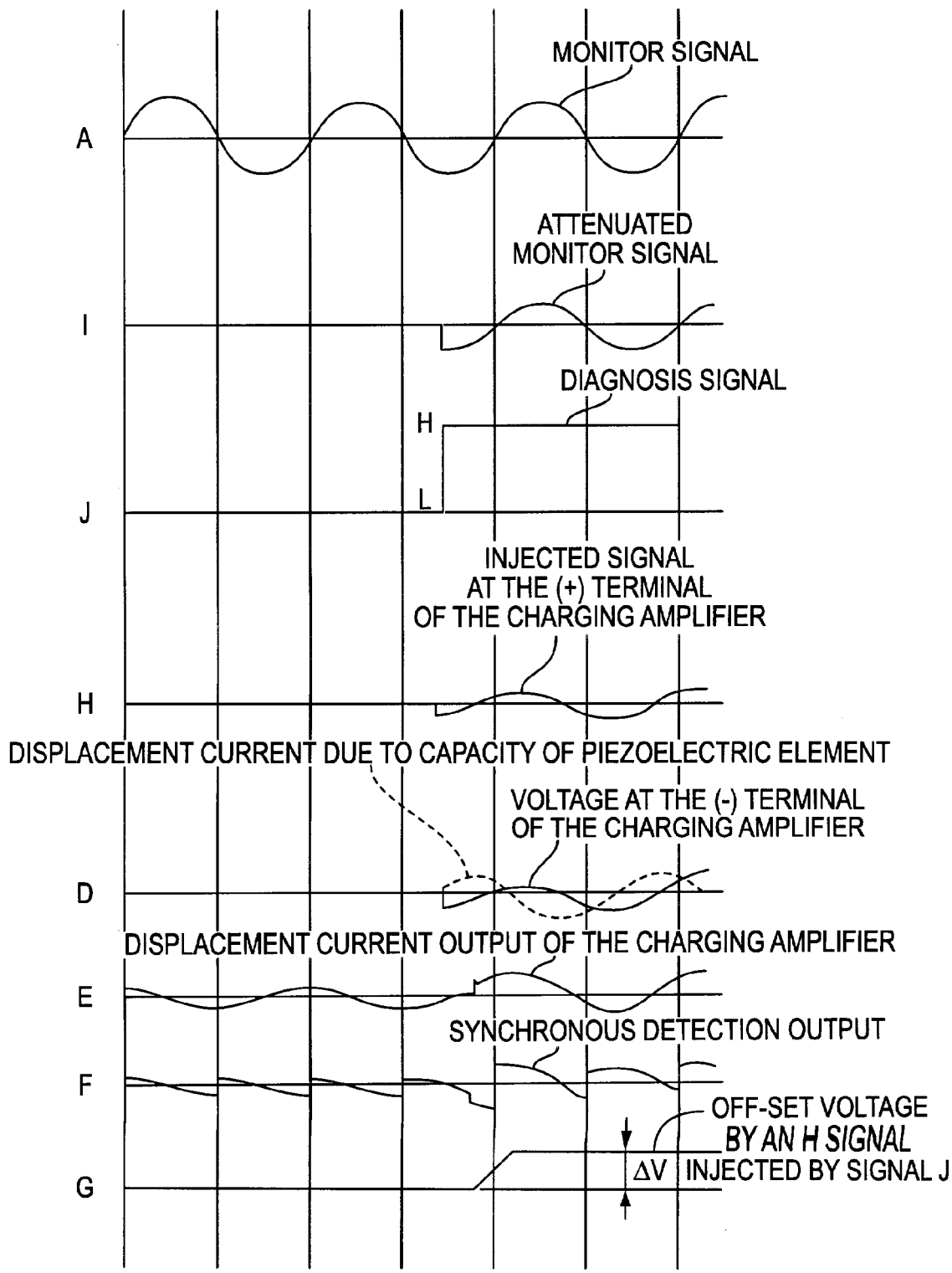
FIG. 15 shows waveforms at various points of the angular velocity sensor.

FIG. 13 is a circuit diagram of an angular velocity sensor in accordance with a sixth exemplary embodiment of the present invention. In addition to the fifth exemplary embodiment, the input of injector 37 is made selectable to connect to the output of attenuator 36 or to the ground by a switch 38 controlled by an external signal from a control terminal 39. A circuit diagram of the essential part is shown in FIG. 14 and waveforms are shown in FIG. 15.

Because monitor signal I attenuated at attenuator 36 is usually in a state of disconnection to injector 37 by switch 38, monitor signal I is not transmitted to injector 37 and accordingly, the sensor outputs are in an ordinary state. When a signal shown by waveform J of FIG. 15 such as a check signal from computer is applied to control terminal 39 shown in FIG. 13, switch 38 closes and signal I from attenuator 36 is transmitted to injector 37. As a result, the signals at each point vary as shown by waveforms H, D, E and F of FIG. 15 and an off-set voltage linked to a check signal applied to control terminal 39 generates at output terminal 24, as shown by waveform G of FIG. 15. Because this off-set variation is determined by equation (4) of the fifth exemplary embodiment, it is possible to know a sensor abnormality by monitoring this off-set variation.

Seventh Exemplary Embodiment

Figure 16:
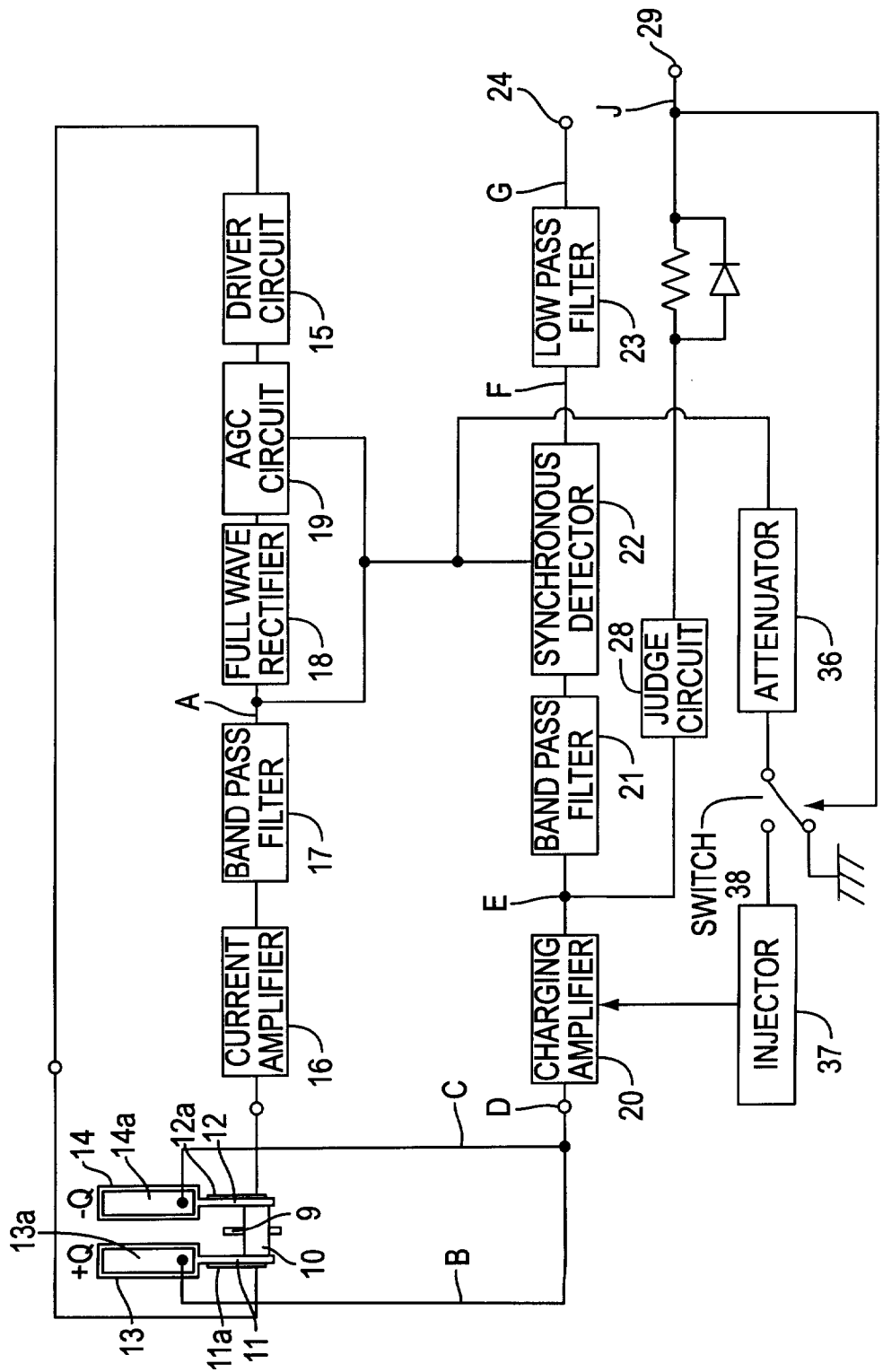
FIG. 16 is a block diagram of an angular velocity sensor in accordance with a seventh exemplary embodiment of the present invention.
Figure 17:
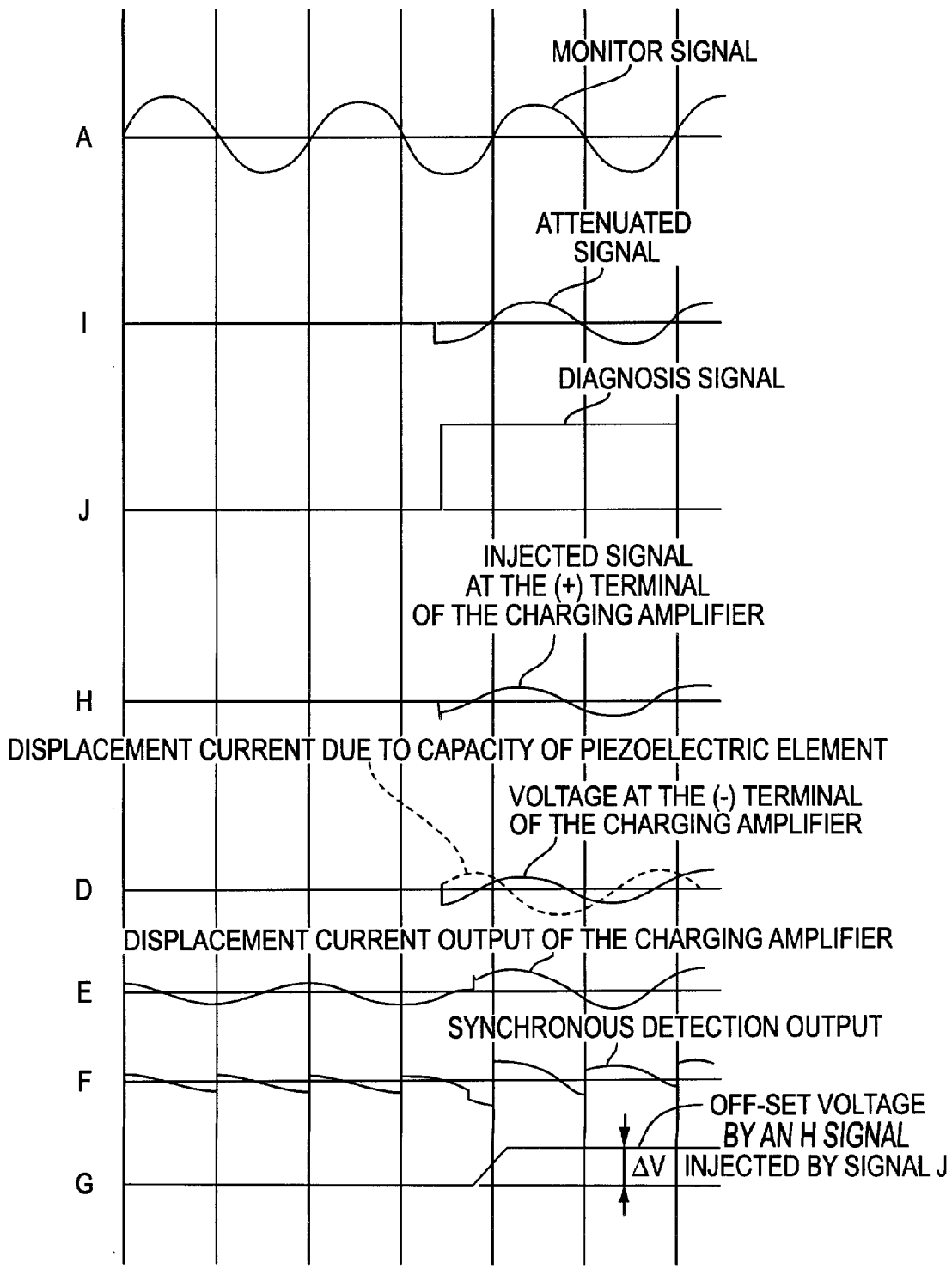
FIG. 17 shows waveforms at various points of the angular velocity sensor.
Figure 18:
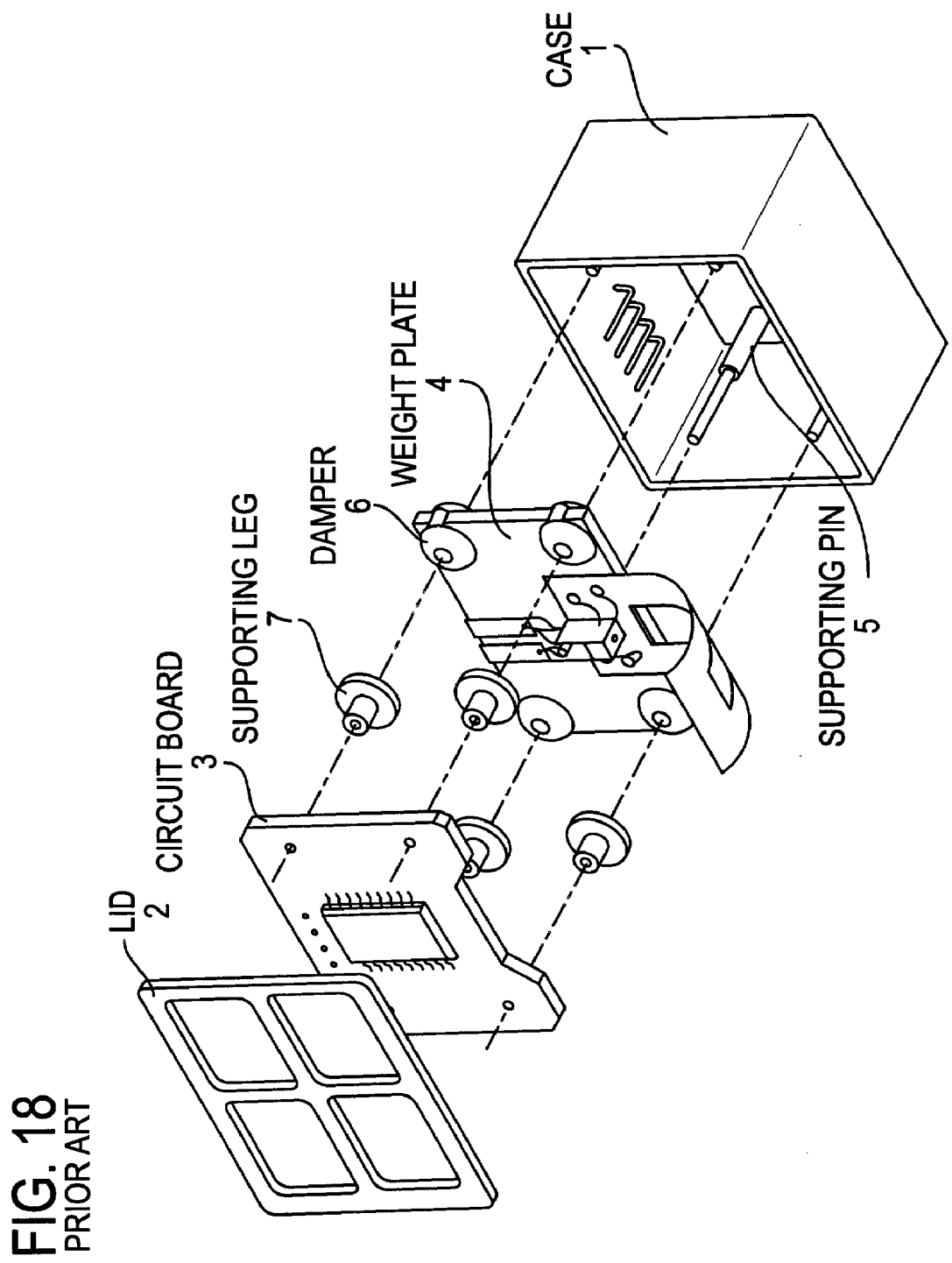
FIG. 18 is a squint view for assembling an essential part of an angular velocity sensor in accordance with the prior art.
Figure 19:
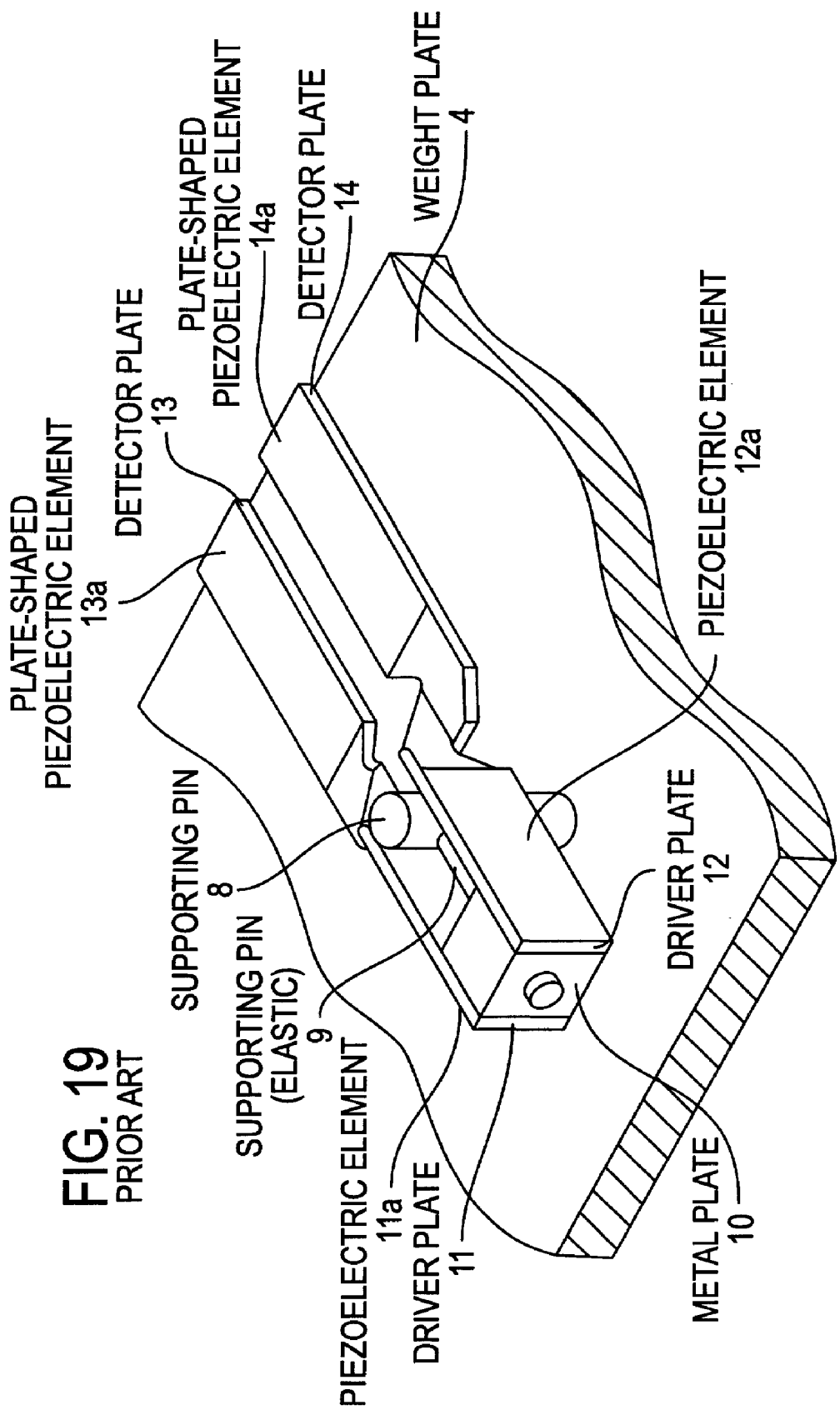
FIG. 19 is an expanded squint view of an essential part of the angular velocity sensor.

FIG. 16 is a circuit diagram of an angular velocity sensor in accordance with a seventh exemplary embodiment of the present invention. The waveforms are shown in FIG. 17. The seventh exemplary embodiment details when an input terminal of the external signal is used in common with output terminal 29 of judge circuit 28. Judge circuit 28 monitors, for example, output E of charging amplifier 20 and detects an abnormal voltage generated by, for example, an abnormal shock or vibration given to the tuning fork from the outside and outputs a signal to inform an abnormality from terminal 29 to the outside. Although the control signal input terminal of switch 38 is used in common with output terminal 29, the connect/disconnect logical value is set to be inverse against the logical output of the judge circuit 28. Therefore, in an ordinary state in which switch 38 is not working, an abnormal voltage generated by an abnormal shock or vibration of the tuning fork given from the outside is detected and the abnormality is informed to the outside. In a state in which the sensor is checked, by inputting a check signal from terminal 29 and monitoring the sensor output of terminal 24, a multifunction diagnosis for malfunction can be made using only one terminal and a high cost performance is realized.

In the case in which connect/disconnect logical value of switch 38 is set to be equal to the logical value of judge circuit 28, it is possible to transfer to a self diagnosis mode by forcibly working switch 38 by the logical output of judge circuit 28 and it is possible to keep outputting a signal as an abnormality detection state at terminal 29 until a reset signal for a self diagnosis mode is supplied from the outside.

Here, although an exemplary embodiment in which a sensor working state is informed using a sensor signal is described, it is possible to off-set adjust the sensor output. In this case, it is good to adjust an attenuation amount by attenuator 36 or adjust the off-set by adjusting the phase shift amount by injector 37. It is possible to temperature compensate for the sensor output by making an attenuation amount or a phase shift amount vary with temperature, using a temperature sensitive element.

It is similar, if the output of injector 37 is applied to band pass filter 21 and synchronous detector 22.

Thus, an angular velocity sensor of the present invention can detect from a state of the mechanical coupling signal whether the angular velocity signal is in a state which can perform a correct detection or not. Moreover, because the mechanical coupling signal is always generated, it is unnecessary to provide independent means for generating the mechanical coupling signal and the composition of the sensor becomes very simple and highly reliable for self diagnosis.

What is claimed:
1. An angular velocity sensor comprising:
   a driver circuit for supplying a driving signal to a tuning fork type driver part of a sensor, having driver plates and detector plates;

a detector for detecting an angular velocity signal from the detector plates of the sensor;

a self diagnosis circuit, for receiving a mechanical coupling signal from the detector part of the sensor, wherein the mechanical coupling signal relates to a mechanical coupling between said detector plates and said driver plates and is indicative of a mechanical coupling malfunction in the sensor, wherein respective ends of the detector plates are attached to respective ends of the driver plates in an orthogonal direction to said driver plates, wherein said self-diagnosis circuit includes:
 a charging amplifier;
 a rectifier;
 a filter; and
 a judging circuit, and wherein the mechanical coupling signal is obtained from the detector plates and is amplified by the charging amplifier, rectified by the rectifier, filtered by the filter, and supplied to the judging circuit, which provides a self diagnosis signal.

2. An angular velocity sensor as recited in claim 1, wherein said driver part is composed of a piezoelectric material.

3. An angular velocity sensor as recited in claim 1, wherein each detector plate provides a separate mechanical coupling signal that is indicative of a malfunction in a mechanical coupling related to a detector plate, and wherein a mechanical coupling signal from each of the detector plates is summed and provided to the self diagnosis circuit.

4. An angular velocity sensor as recited in claim 3, wherein the sum of the mechanical coupling signals obtained from said detector plates is initially set to a designated value other than zero.

* * * * *